United States Patent [19]

Holladay

[11] 4,245,258
[45] Jan. 13, 1981

[54] METHOD AND APPARATUS FOR REDUCTION OF FALSE CONTOURS IN ELECTRICALLY SCREENED IMAGES

[75] Inventor: Thomas M. Holladay, Webster, N.Y.

[73] Assignee: Xerox Corporation, Stamford, Conn.

[21] Appl. No.: 91,282

[22] Filed: Nov. 5, 1979

[51] Int. Cl.³ .............................................. H04N 1/40
[52] U.S. Cl. ................................. 358/283; 358/280; 364/515
[58] Field of Search .............. 358/283, 280, 138, 260, 358/261; 364/515

[56] References Cited

U.S. PATENT DOCUMENTS

| 3,294,896 | 12/1966 | Young | 358/283 |
|---|---|---|---|
| 3,739,082 | 6/1973 | Lippel | 358/138 |
| 3,916,096 | 10/1975 | Everett | 358/283 |
| 4,184,206 | 1/1980 | Harano | 364/515 |
| 4,205,341 | 5/1980 | Mitsuya | 358/260 |

OTHER PUBLICATIONS

*IRE Transactions on Information Theory*, Feb. 1962, pp. 145-154, "Picture Coding Using Pseudo-Random Noise"—L. G. Roberts.
*Proceeding of the S.I.D.*, vol. 15/4, Fourth Quarter 1974 pp. 161-169, C. N. Judice et al., "Using Ordered Dither To Display Continuous Tone Pictures on an AC Plasma Panel".
*Proceeding of the S.I.D.*, vol. 19/3, Third Quarter 1978, pp. 127-131, R. W. Pryor et al., "Bilevel Image Displays—A new Approach".

*Primary Examiner*—Howard W. Britton
*Attorney, Agent, or Firm*—Michael H. Shanahan

[57] ABSTRACT

An electrical screening system for binary displays or binary graphic recording systems is disclosed which suppresses false contours. The suppression is achieved by increasing the number of gray levels that a given $m \times n$ matrix of pixels can represent. Each pixel can only represent one of two gray levels in a binary display or graphic system. A conventional $m \times n$ halftone cell is able to reproduce $m \times n + 1$ gray levels. The extra gray levels above the $m \times n + 1$ quantity are achieved for a given $m \times n$ halftone cell by dynamically changing the values of the $m \times n$ screen signals associated with a halftone cell. The amount of the change is limited to a value between zero and D inclusive where D is the difference between two adjacent screen signal values.

16 Claims, 4 Drawing Figures

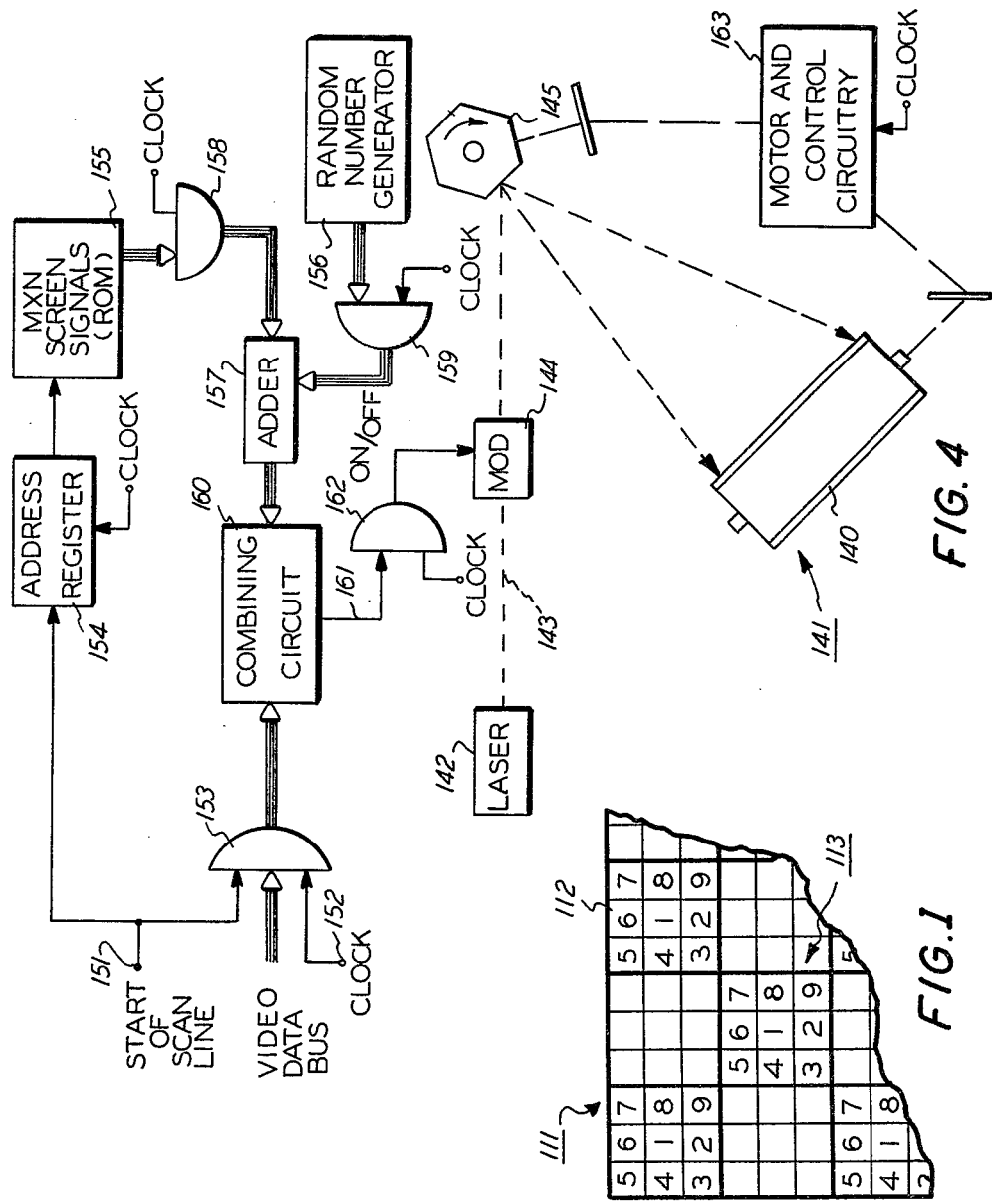

METHOD AND APPARATUS FOR REDUCTION OF FALSE CONTOURS IN ELECTRICALLY SCREENED IMAGES

BACKGROUND

This invention relates to electrical signal recording or writing systems for binary media. Specifically, this invention relates to halftone screening method and apparatus for suppressing false contours in continuous tone images simulated on binary media.

Binary media is intended to refer to media which has resolution elements, picture elements (pels) or pixels that are capable of assuming either of two states, e.g. black or white. Classically, continuous tone images are simulated on binary media by organizing groups of pixels into areas called halftone cells usually m×n matrices. The halftone cell has a gray level capability equal to the number of pixels in the halftone cell plus one (for all black or all white). However, in low resolution displays (e.g. CRT and gas panel displays) and graphic recording systems (e.g. xerographic, ink jet and electrostatic), the size of the halftone cell is noticeable to a human observer and can be objectionable. The more pixels included in a cell means that more gray levels can be reproduced. But, as the halftone cell becomes larger, the presence of the cell in the image becomes more objectionable to a human observer.

The process of simulating continuous tone or gray level images with the halftone cell technique has several limitations. One limitation is associated with the ability of the human eye to detect very small changes in density (or intensity) when there are large areas for the eye to compare. False contours are image defects that occur in large areas having comparatively constant densities. An example is a nearly uniform sky in an outdoor photograph. A false contour shows up in the sky in a reproduction because subtle differences in the density of the sky are smaller than the spacing between gray levels capable of being simulaed by the halftone cells of the screen.

Heretofore, false contours are suppressed by increasing the number of pixels within a gray scale by increasing the cell size. The suppression of false contours is of course achieved at the expense of a more noticeable screen pattern in the imaage.

SUMMARY

Accordingly, a main object of this invention is to suppress false contours in simulated continuous tone images created with binary media without lowering the quality of the image.

An object consistent with the foregoing is to increase the number of gray levels reproduced with a binary medium without increasing the number of pixels contained in a halftone cell.

Also, it is an object of this invention to vary the screen signal values associated with each pixel in a halftone cell from cell to cell to obtain over the entire image more gray levels than just those levels associated with a fixed number of pixels in a halftone cell.

The above and other objects of this invention are realized by dynamically varying the values of screen signals associated with a halftone cell. The variations do not exceed the separation between adjacent screen signal values. For example, a halftone cell composed of a 3×3 matrix of pixels is capable of simulating 10 gray levels. The number 10 is arrived at by counting the total number of pixels in the cell, 9 in this case, and adding one. The extra gray level is to take into consideration the gray level associated with all the pixels being set to the logical off state, for example, all black or all white.

Again by way of example, the 9 screen values associated with the 9 pixel locations in the cell are evenly spaced over the tonal range to be reproduced. For the case where the screen signals are in the form of an eight bit binary number, the total tonal or density range available is 256 units. Nine evenly spaced screen signal values start at one end of the density range with a value near 28 (approximately 256 divided by 9) and progress to the other end by increments of 28 ending near 252.

The present improvement includes changing the fixed screen signal values associated with a given halftone cell by an increment less than the spacing between screen signals. The change or modification to a screen signal must vary at least from cell to cell. Preferably, the change is made from screen signal to screen signal within every cell. A random number generator and a sequential, cyclic number generator (a counter) are two devices suitable for making the changes to the screen signals.

References

The use of random noise in the facsimile art is reported by Lawrance Gilman Roberts in a February, 1962 article titled "Picture Coding Using Pseudo-Random Noise" in the *IRE Transactions on Information Theory*, pages 145 to 154. The idea set forth in this article is basically a data compression scheme. The continuous tone spectrum of electrical signals produced by a facsimile scanner is randomly quantitized to reduce the amount of information to be transmitted to a facsimile receiver. The basic concept is that an image of the original document at the transmitter can be recreated at the receiver nearly as well from randomly varying slices of the continuous signal generated by a scan of the document as can be recreated from the noise plagued continuous signal sent to the receiver. More importantly, the bandwidth required to transmit the data representative of the image is greatly reduced. Put in other words, the amount of data required to be transmitted over a particular bandwidth channel to create an acceptable facsimile at the receiver can be significantly reduced by thresholding the video data with the randomly generated level. This means good copies at the receiver at higher speeds and lower costs.

In contrast, this invention involves combining a number generator with a halftone screen generator. Halftone screen systems are reported by James M. Barry et al in U.S. Pat. No. 3,977,077; David Behane et al in U.S. Pat. No. 3,604,846; C. N. Judice et al in an article titled "Using Ordered Dither To Display Continuous Tone Pictures On An AC Plasma Panel" at pages 161–169 of the *Proceeding of the S.I.D.*, Vol. 15/4 Fourth Quarter, 1974; and an article by R. W. Pryor et al titled "Bilevel Image Displays A New Approach" at pages 127–131 of the *Proceeding of the S.I.D.*, Volume 19/3 3rd Quarter 1978.

The combining of a varying signal with a screen signal for a given halftone cell is not suggested by the preceding literature. For one, the display art and the graphic art employing electrical signal processing already understand the halftone cell as a quantization of the image input data and would consider the present scheme as redundant. Also, the expectation would be that the present combination would introduce noise into a resultant image that would not be offset by benefits such as gray scale suppression. Such expectations are incorrect and suprisingly, the images created by the present technique are greatly improved over prior art screened halftone images.

DESCRIPTION OF THE DRAWING

Other objects and features of the invention are apparent from a complete reading of the specification alone and in combination and the drawings which are:

FIG. 1 is a schematic representation of a portion of a halftone screen for a graphic medium. The smallest squares are pixels. A 3×3 halftone cell is employed in this screen. The growth pattern for the halftone cell is a spiral identifiable by tracing the pixels in the numbered sequence. The numbers are shown in every other halftone cell for ease of viewing and it should be understood (for FIGS. 2 and 3 as well) that even the un-numbered 3×3 squares contain like numbers. Each 3×3 cell can represent ten gray levels.

FIG. 4 is a schematic representation of a xerographic recording system in which the present screening method and apparatus are implemented.

DETAILED DESCRIPTION

A well known halftone screen in the printing arts is a photograph of a line screen roughly resembling a mesh wire fence. An electronic halftone screen refers to electrical means for altering video data existing in a raster scan pattern in a manner to approximate the wire fence mask or overlay used in projection systems.

FIG. 1 represents an electrical halftone screen. Screen 111 is a pattern by which a plurality of electrical screen signals are organized to correspond to a raster scan pattern used by an electrical recorder. Screen 111 is made up of a plurality of small squares 112 that correspond to an electrical screen signal and pixel locations in a rectangular raster scan appropriate for an electrical recorder. Other raster patterns besides the rectangular pattern shown are possible. Also, the screen 111 can have an angle between zero and 90° inclusive. For present purposes, the zero angle screen is all that is necessary to discuss to adequately describe the invention. The application of this invention to other screen angles is trival.

The pixels 112 are organized into groups of 3×3 pixels that define a halftone cell 113. The 3×3 cell is arbitrary and used as a convenient cell size to describe the invention. A cell of m×n dimensions describes the general case. Each cell 113 includes nine pixels or screen signals. The numbers 1-9 within each cell identify the nine different screen signal values possible for the cell according to previous practice. The order or arrangement of the screen signals within the cell is called the growth pattern. The cells shown have a spiral growth pattern identifiable by tracing the numbers in either an ascending or descending sequence.

Figure 3:
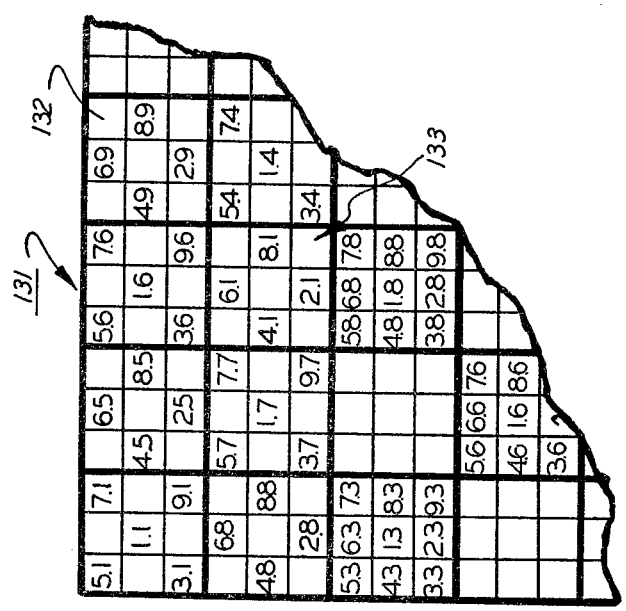
FIG. 3 is a schematic representation of a portion of a halftone cell of FIG. 1 with the pixels or screen signal values within a halftone cell being changed by a fixed amount but with the change from cell to cell varying randomly to illustrate another embodiment of the invention.
Figure 2:
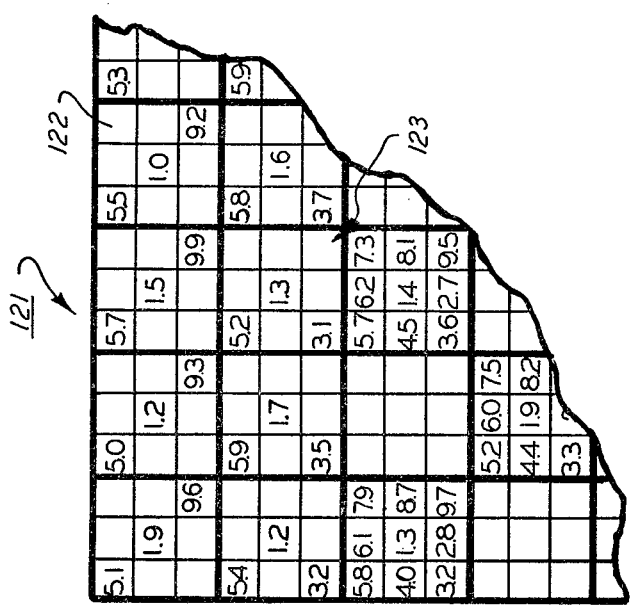
FIG. 2 is a schematic representation of a portion of the halftone screen in FIG. 1 with the screen signal values at every pixel in the screen changed randomly from pixel to pixel according to one embodiment of this invention.

FIGS. 2 and 3 illustrate two embodiments of the present invention. In both FIGS. 2 and 3, the screen signals 122 and 132 differ from corresponding nominal screen signals 112 by an amount D that is a tenths place decimal. The decimal means that a given screen signal 122 or 132 differs by some value D that is a percentage of the difference between two adjacent screen values 112. For example, 5.1 associated with a screen signal in FIG. 2 or 3 means its value is larger than a corresponding screen signal in FIG. 1 of the value 5 by one tenth the difference between the values of screen signals 5 and 6 in FIG. 1.

The decimal notation is made to clearly point out that the extra gray levels obtained by the present invention are obtained by altering or changing the fixed number of gray levels associated with a normal screen 111. Also, the decimal notation is used to emphasize that the change made to a normal screen signal 112 are zero or less than the separation between adjacent screen signal values.

The actual addition made to a normal screen signal 112 is easily implemented on a percent basis when the difference between the screen signals 112 are all equal, e.g. 28. In such case, a number generator, e.g. a random number generator or an up-down counter, that produces numbers between zero and 27 can readily achieve most precentage changes. If the spacing between signals 112 are not equal, the spacing must be calculated and the limit on the largest number a generator can produce must be set to the calculated number.

In fact, the spacing between screen signal values may be logrithmic and therefore not the same between all the signals within a halftone cell. Also, other signal spacings—i.e. that are not substantially fixed—may be desirable in suited applications. The adaption of this invention to such modified screens should be apparent and is intended to be within the scope of this invention.

The screen 121 in FIG. 2 is the same as screen 111 in FIG. 1 except that each screen signal 122 has been increased by a randomly generated value represented by the decimal. (Not all values are shown for ease of reading the numbers.)

The screen 131 in FIG. 3 is the same as screen 111 in FIG. 1 except that each screen signal 132 within a halftone cell 132 has been increased by the same decimal amount. The screen signals in different cells 133 have different randomly generated values added to them. That is, one cell has 0.1 added to each screen signal within the cell, another cell 0.5, still another 0.6 and so on.

The screens 121 and 131 have a hundred more gray levels than the screen 111 with 10 additional gray levels existing between each of the signal values in screen 111. The extra gray levels do not appear in each cell but appear a statistically large number of times over a full image, e.g. an image that is 8.5×11 inches. In practice, the space between adjacent screen signals is divided into many more than ten increments. For example, in the embodiment of FIG. 4, the spacing is divided into twenty-eight increments as is described below. The result even for the embodiments of FIGS. 2 and 3 are dramatic for suppressing false contours without otherwise degrading image quality, such as by making the screen more noticeable to an observer.

The false contours are suppressed with screens according to this invention because the spacing between screen signals is subdivided and distributed over the entire screen e.g. an 8.5×11 inch surface. The extra screen values located in the subdivided region enables the subtle density changes in a sky, for example, to be at least partially reproduced. This means the human eye has less discontinuity to detect against a large area of relatively constant density.

The screen in FIG. 2 is generated dynamically by adding a number to a standard screen signal like a signal 112. It should be understood that the changed values can be pre-constructed and stored in a memory. However, screens like screen 111 are repetitive and as such only a portion of the screen needs to be stored in memory. The entire screen is generated by cyclically repeating the stored screen segment. By adding a small number to the stored values the screens of the present invention can be implemented without significantly adding to the memory requirements of a system.

FIG. 4 is an exemplary graphic system for recording images from electrical signals. A graphic or recording medium in the system of FIG. 4 is a photoconductive layer 140 on a rotating drum 141. Other graphic systems include ink jet recorders of the type reported by Sweet in U.S. Pat. No. 3,596,275, by Sweet and Cumming in U.S. Pat. No. 3,373,437 and by Lewis in U.S. Pat. No. 3,298,030. The disclosures of all those patents are incorporated herein by reference. The surface of the photoconductor 140 is uniformly electrostatically charged by a corona generator (not shown) positioned adjacent the drum. The charged drum surface is exposed to a spot of light generated at laser 142 and directed to the drum over the optical path identified by the dashed line 143.

A latent electrostatic image is created on the surface of drum 141 during the rotation of the drum. The spot from the laser 142 is turned on and off (effectively) by modulator 144 such as an acoustic-optical piezoelectric cyrstal device available from the Zenith Corporation. The modulator 144 permits or prevents the light emitted by the laser to pass through it along the balance of the optical path 143. An electrical signal referred to as an output marking signal is applied to modulator 144 to effect the on-off state of the light source at the drum 141.

The laser spot is swept across the drum 141 by a rotating polygon mirror 145. The mirror rotates at speeds as high as several hundreds of revolutions per minute (rpm). That rpm is multiplied by the number of faces on the polygon (6 in the example shown). The spot is able to travel the length of drum 141 in a length of time that is adequate to consider the rotation of the drum 141 to be negligible. Between scans, the drum rotates a distance sufficient to position the spot one scan line away from the previous scan line. In this way, a full raster is created in a scan line by scan line fashion. Each scan line is subdivided in time so that a number of pixels in a given scan line are addressed by the moving laser spot. Each on-off clocking of the modulator 144 defines a pixel within a scan line.

The light spot from the laser 142 discharges the charge on the drum. Consequently, a latent electrostatic image is created on the surface of the drum corresponding to the electrical image and screening signals being employed. This latent image is made visible by depositing electrostatically charged toner particles (not shown) onto the drum surface by a development device located adjacent the drum (not shown). The visible toner image is in turn electrostatically transferred to plain paper (not shown) to provide an image made up of black markings (the toner) on white paper, for example. Conventionally, the toner is permanently bonded to the paper by heating and cooling the toner.

The electrical image signals are supplied from an appropriate source (not shown) to the video data bus 150 of the system of FIG. 4. The image signals may be created artifically by electrical equipment or by examining an original document on a pixel by pixel basis and generating a digital or analog signal representative of the reflection density (or transparency) of a pixel.

Each image signal represents the intensity or density of a pixel in an electrical image. The image signals are applied to the video terminal 150 in a pixel by pixel, line by line sequence compatible with the raster pattern being employed. In addition, a start scan signal is applied to the system of FIG. 4 at terminal 151 to align the video signals with the rotation of drum 141.

The video or image signal, start of scan signal and a system clock signal at terminal 152 are applied to the AND gate 153. This gate applies the video data to the combining circuit 160. Simultaneously, the start of scan signal is applied to the address register 154 which serially addresses stored screen signals in the Random Output Memory (ROM) 155. The screen signals are stored as eight bit numbers in ROM 155. The difference between adjacent screen signals values is about 28, radix 10, for the example used throughout which is 11100, radix 2. Consequently, the five least significant bits of the eight bit binary number representative of a screen signal is what is dynamically varied in this embodiment. The change is limited to numbers ranging from zero to 27. A five place binary number can generate the numbers zero through 31 so the number generator must be prevented from generating the numbers 28–31.

Changes are made to the screen signals in this embodiment with a five bit random number generator 156. An eight bit screen signal and a five bit random number are synchronously applied to a digital adder 157 through AND gates (or enable gates) 158 and 159 by the system clock. The adder 157 adds the binary number from the random generator to the five least significant bits of the screen signal number. The sum is a new screen signal corresponding to the screen signals in screen 121 of FIG. 2. The screen of FIG. 3 is more complicated to generate because the cells 132 extend over three scan lines. To implement the screen of FIG. 3, memory is used to hold random numbers until a full halftone cell is generated which amounts to three scan lines of screen signals for the 3×3, zero angle screen of this example.

A two level output marking signal is generated by circuit 160 in response to the sum from adder 157 (the screen signal) and the image signal from gate 153. Both the image and screen signals are eight bit binary numbers in electrical signal form. The combining circuit, in this embodiment, compares the binary va'ues of the two signals and puts the output marking signal to an "On" level if the image signal is less than the screen signal value and to the "Off" level if the image is equal to or greater than the screen signal value.

The output signal is applied to the modulator 144 over lead line 161. The application of the output marking signal to the modulator is gated by the system clock through the AND (or enable) gate 162.

The "On" state of the marking signal permits the light from laser 142 to pass through the modulator 144 and proceed to the drum 141. At the drum, the light spot discharges a small pixel size area. The discharge of the surface means that toner is not attracted to the drum at that location. The "Off" state of the marking signal prevents the laser light from passing the modulator and means that toner is attracted to the drum at the given pixel location in the latent electrostatic image.

The combining circuit 160 in other embodiments may develop an output signal by multiplying the image and screen signal values together or with a constant. Also, techniques involving adding the image and screen signals together are known which enable a decision to be made concerning the density of a pixel represented by the image signals.

The rotation of the polygon mirror 145 and of the drum 141 is done with separate motors. The two motors and their control circuitry are represented by the block 163. The rotation speeds of the polygon and the drum are synchronized to each other and the video data rate by means of the system clock. The clock is shown being applied to the motor control circuitry.

Other embodiments of the invention will be apparent from the foregoing description. The scope of the invention is intended to embrace those embodiments.

What is claimed is:

1. An electrical screening method for suppressing false contours in recordings made on binary graphic or display media comprising defining a halftone cell including a group of pixels organized in an m×n matrix with each pixel representing areas on a medium capable of assuming either of two gray levels, assigning m×n different values representative of gray levels to m×n different screen signals with the values being separated from adjacent values by at least a minimum difference D and organizing the screen signals in a pattern corresponding to a halftone cell, changing the value of screen signals by an amount between zero and D inclusive, and combining the changed screen signals with electrical image signals representative of the gray level of a pixel in an original image for generating an output marking signal capable of setting a corresponding pixel in a medium to one or the other of its two gray levels in response to the combining.

2. The method of claim 1 wherein the screen signals are arranged in halftone cells that are oriented at an angle between zero and ninety degrees inclusive.

3. The method of claim 1 wherein the change to the screen signals within a given halftone cell are the same but differ from cell to cell.

4. The method of claim 1 wherein the change to the screen signals within a halftone cell are different from screen signal to screen signal.

5. The method of claim 1 wherein the change to the screen signal is randomly selected within the limits of zero to the value D.

6. The method of claim 1 wherein the change to the screen signal is systemically changed by increments between the limits of zero and the value D.

7. The method of claim 1 wherein the combining step includes comparing the magnitudes of image and changed screen signals and setting the output marking signal to one of two levels representative of which is the greater.

8. Electrical halftone screening apparatus for recording on a binary graphic or display medium comprising storage means for storing a plurality of screen signals having m×n different values separated from adjacent values by at least an amount D with the m×n different screen signals being organized to correspond to a plurality of halftone cells of an m×n matrix of pixels on a medium, adder means coupled to the storage means to receive screen signals in a sequence corresponding to a raster pattern of pixels for changing the value of a screen signal by an amount between zero and the value D inclusive and combining means coupled to the adder means and adapted to receive image signals representative of the gray level of a pixel in an original image for combining the image and changed screen signals to generate an output marking signal capable of setting a pixel on a medium to one of its two binary gray levels in response to the combining step to suppress false contours in an image reproduced by a medium.

9. The apparatus of claim 8 wherein a random number generator is coupled to said adder means for adding a random number to each of the screen signals received from the storage means.

10. The apparatus of claim 8 wherein a cyclic counter means is coupled to said adder means for adding a cyclically reoccurring numbers to each of the screen signals received from the storage means.

11. The apparatus of claim 8 wherein the halftone cell pattern is organized at an angle between zero and ninety degrees inclusive.

12. The apparatus of claim 8 wherein the combining means includes means for generating a two level output signal that assumes one level when an image signal is greater than a screen signal and the other level when less than the screen signal.

13. The apparatus of claim 8 further including an electrophotographic recording means coupled to receive the output marking signals for creation of a latent electrostatic image on a photoconductive member.

14. The apparatus of claim 13 wherein the electrophotographic recording means includes development means for developing latent electrostatic images with a toner material.

15. The apparatus of claim 8 further including an ink jet recording means coupled to receive the output marking signals and to create images with ink drops on paper in response to the output signals.

16. The apparatus of claim 8 further including a CRT display means coupled to receive the output marking signals and to create images in response to the output signals.

* * * * *